Oct. 31, 1972 W. H. BAKER 3,701,558
DETACHABLE HANDLE FOR RECEPTACLE
Filed July 19, 1971
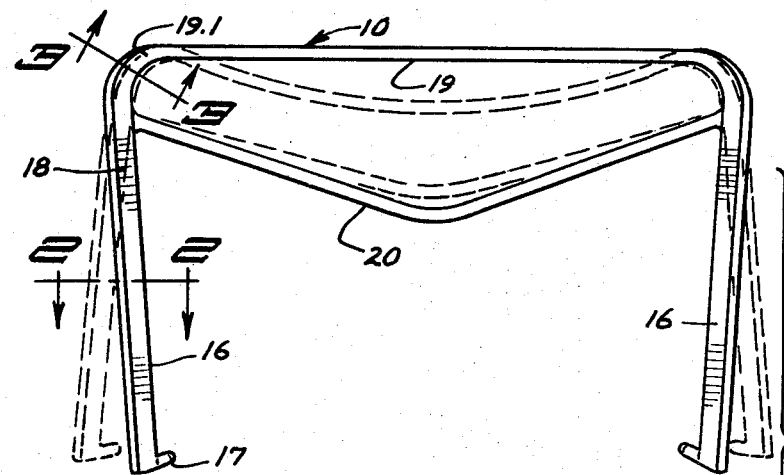
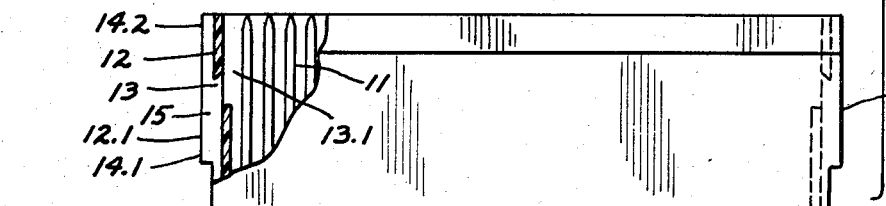
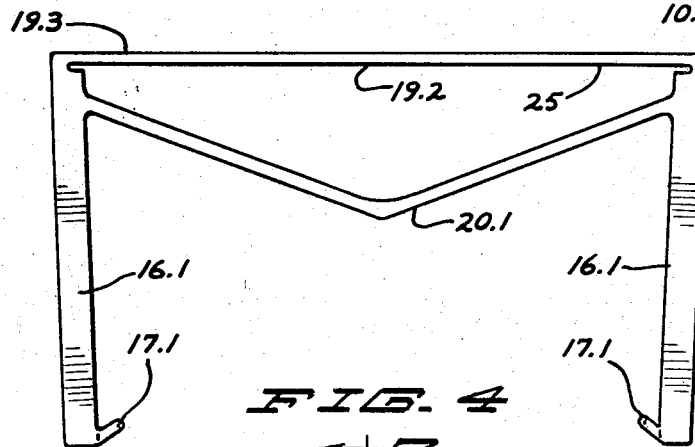
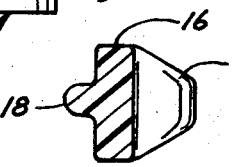
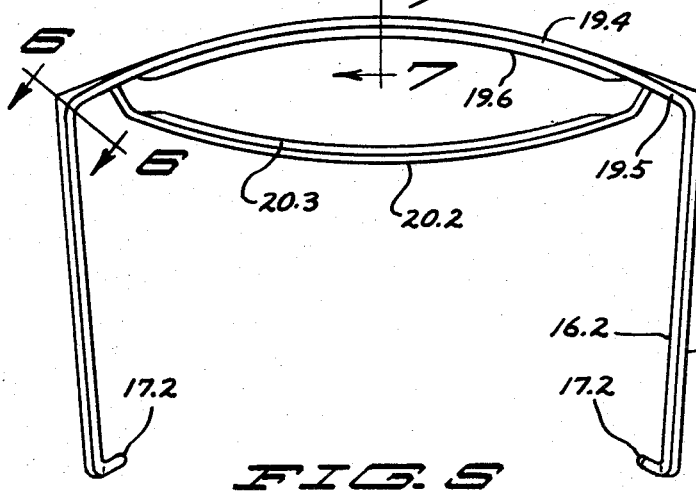
INVENTOR.
WILLIAM H. BAKER
BY
ATTORNEYS

United States Patent Office 3,701,558
Patented Oct. 31, 1972

3,701,558
DETACHABLE HANDLE FOR RECEPTACLE
William H. Baker, Chaska, Minn., assignor to Fluoroware, Inc., Chaska, Minn.
Filed July 19, 1971, Ser. No. 163,966
Int. Cl. A47j *45/07*
U.S. Cl. 294—33
10 Claims

ABSTRACT OF THE DISCLOSURE

A detachable lifting handle for a receptacle, wherein depending leg portions swing outwardly to release the receptacle, and transverse and superposed flexible bars extending between the leg portions produce outward swinging of the legs when squeezed together.

BRIEF SUMMARY OF THE INVENTION

The detachable lifting handle has transverse flexible bars to be manually gripped and squeezed toward each other to manipulate the legs for attachment to and detachment from a receptacle. The bowing of the upper bar pulls the upper ends of the legs toward each other, and because the connection between the upper bar and each of the legs is quite stiff, the bowing of the upper bar and the resulting angular reorientation of the ends of the bar causes swinging of the legs relative to each other to release the receptacle. The lower bar is normally bowed downwardly away from the upper bar so that flexing of it causes straightening, which results in lengthening. The legs are thereby urged away from each other, so as to swing the lower ends of the legs away from each other as the upper ends of the legs are restrained.

The manual gripping and squeezing of the upper and lower bars produces a compounding of the motion introduced by either of the bars alone so as to multiply the motion of the lower ends of the legs. As a result, the handle may be readily and easily applied to the receptacle with an absolute minimum of difficulty. A person need only use one hand to manipulate the handle for both applying it to the receptacle and for removing the handle from the receptacle.

When the handle is connected to the receptacle, only the upper bar is gripped for lifting the receptacle. The resultant bowing of the upper bar tends to tighten the grip of the legs on the receptacle.

BRIEF DESCRIPTION OF DRAWINGS

FIG. 1 is an elevation view of the handle and the receptacle to which the handle is to be attached, the receptacle being broken away in part for clarity of details, and the detachable handle having a dotted line position also illustrated.

FIG. 2 is an enlarged detail section view taken at 2—2 in FIG. 1.

FIG. 3 is an enlarged detail section view taken at 3—3 in FIG. 1.

FIG. 4 is an elevation view of an alternate form of the detachable receptacle handle.

FIG. 5 is an elevation view of another alternate form of the receptacle handle.

FIG. 6 is an enlarged detail section taken at 6—6 in FIG. 5.

FIG. 7 is an enlarged detail section taken at 7—7 in FIG. 5.

DETAILED DESCRIPTION OF THE INVENTION

In the form of the invention shown in FIG. 1, the handle is indicated in general by numeral 10 and is particularly well adapted to pick up and carry a receptacle of the type known as a plate and wafer basket 10.1. The receptacle 10.1 is generally similar to the type of tray used for carrying slides mounted in glass and other similar type of wafer-like objects. Oftentimes, the wafers or plates being carried in the basket or receptacle are extremely valuable and should not be touched by a person's hand. The receptacle 10.1 may have dividers 11 to separate the edges of the plates or wafers carried therein, and the receptacle has an end wall 12 with an opening 13 therein to facilitate attachment of the handle 10. The end wall 12 has an offset portion 12.1 located beneath the opening 13 to cooperate with ribs 14.1 and 14.2 in defining in a guideway 15 which is well adapted for guiding the lower portions of the depending legs 16 of the handle into proper orientation with respect to the opening 13 so that the receptacle will be properly clamped and held by the handle 10. When the depending legs 16 are confined between the ribs 14.1 and 14.2 at each end of the receptacle, the ribs will prevent the receptacle 10.1 from tilting or moving transversely with respect to the depending legs 16.

The handle 10 and the receptacle 10.1 are constructed of a suitable molded plastic material. The depending legs 16 of the handle 10 have inwardly and obliquely unwardly projecting lugs 17 for insertion into the openings 13 for attachment to the receptacle 10.1. It will be noted that the upper edge 13.1 of the opening in the end wall 12 of the receptacle is obliquely inclined to conform to the oblique arrangement of the lug 17.

The depending legs 16 are stiff and relatively inflexible, and are provided with an elongate rib 18 extending along the outer side so as to increase the rigidity.

The handle 10 includes leg manipulating means which specifically comprises a pair of elongate and stiff, but resiliently flexible upper and lower bars 19 and 20 which are molded integrally with the upright legs 16. The opposite ends of the upper bar 19 are connected to the upper ends of the legs 16 in a stiff and substantially non-hinging connection, approximately at 19.1. As indicated by the dotted lines, the upper bar 19 is flexible and may be bowed in order to assist in manipulating the legs 16. The bowing of the bar 19 to the dotted line position causes the upper ends of the legs 16 to be drawn or pulled inwardly, and, of course, this tends to swing the lower ends of the legs 16 outwardly; and, in addition, the bowing of the upper bar 19 causes an angular reorientation of the ends of the bar 19 and, because of the stiff and substantially non-hinging connection 19.1 to the upper end of each of the legs, the reorientation or the tilting of the ends of bar 19 cause the legs 16 to be tilted also.

In this form illustrated in FIG. 1, the lower bar 20 is bowed in its relaxed condition, and in a direction downwardly away from the upper bar 19. The ends of the lower bar 20 are connected to the legs 16 at a location slightly below the upper ends of the legs 16 and in downwardly spaced relation from the upper bar 19. The lower bar 20 is intended to flex from the bowed position to a somewhat more nearly straightened condition so as to extend the length of the bar 20 and slightly separate the adjoining legs 16 from each other. Because the upper ends of the legs 16 are restrained from outward movement by the upper bar 19, this outward pressure by the straightening and lengthening of the lower bar 20 causes the lower ends of the legs 16 to swing outwardly.

Of course the combined flexing of the lower bar 20 to the dotted line position thereof illustrated in FIG. 1, and the flexing of the upper bar 19 produces a multiplying effect upon the motion produced in the legs 16, tending to swing the lower ends thereof outwardly.

As illustrated in FIG. 1, in the relaxed condition of the handle 10, the lower ends of the legs 16 are disposed well inwardly of the ends of the receptacle 10.1.

When the handle 10 is to be applied unto the receptacle, a person need merely grip the bars 19 and 20 with one hand and squeeze the bars 19 and 20 toward each other to produce the flexing shown in the dotted line positions in FIG. 1. This flexing of the bars 19 and 20 will produce the outward swinging of the legs 16 into the dotted line positions illustrated, whereupon the handle 10 may be simply lowered along the end walls of the receptacle and the legs 16 will be fitted into the grooves 15 between the upright ribs 14.1 and 14.2.

The lug or projection 17 will slip easily into the opening 13 when the pressure on the bars 19 and 20 is relaxed, and the handle 10 will thereupon be tightly attached to the receptacle 10.1. When the bars 19 and 20 have been released and relaxed, the resiliency in the bars continuously draws the legs 16 inwardly against the end wall 12 of the receptacle so as to maintain the lug or projection in the opening 13.

When the receptacle 10 is to be carried, the upper bar 19 is utilized to lift the receptacle handle, and the weight of the plates or wafers in the receptacle will be carried by the legs 16 and bar 19. The weight of the receptacle and wafers, when lifted, will cause an upward or outward bowing of the upper bar 19 which tends to continue and increase the inward pressure at the lower ends of the legs 16 tending to hold the legs 16 against the receptacle end walls and hold the lugs or projections 17 in the openings 13.

The form of the handle 25 illustrated in FIG. 4 is similar to that illustrated in FIG. 1 in most respects and has the stiff upright legs 16.1 and the inwardly projecting lifting lugs 17.1 attached to the lower ends of the legs. The lower bar 20.1 is substantially identical to that illustrated in FIG. 1 with the exception that instead of being smoothly bowed, the lower bar 20.1 is angularly bowed or bent at the midpoint. The upper bar 19.2 is stiff, but somewhat resiliently flexible, but, in this form of the invention, the ends of the upper bar 19.2 are connected to the upper ends of the legs 16.1 in a substantially flexible connection 19.3. The bowing of the upper bar 19.2 draws the upper ends of legs 16.1 inwardly because of the shortened length between the ends of the upper bar 19.2, but the reorientation of the end portions of the upper bar 19.2 has little or no effect upon the position of the upper ends of the legs 16.1 except insofar as the upper bar 19.2 is shortened because of the bowing.

As in the form of the invention illustrated in FIGS. 1–3, the squeezing of the upper and lower bars 19.2 and 20.1 produces an outward swinging of the lower ends of the legs 16.1, thereby facilitating application and removal of the handle 25 on the receptacle 10.1.

The form of the invention illustrated in FIG. 5 also includes upright legs 16.2 which are stiffened by ribs 18.1, and the ribs 18.1 extend upwardly and around the angular connection to the top crossbar 19.4. Because of the extension of the rib 18.1 upwardly onto the adjoining portion of the upper bar 19.4, any reorientation of the end portions 19.5 of the upper bar causes a comparable reorientation of the upper portion of leg 16.2 and a swinging motion of the lower ends of the legs 16.2. In order to provide the desired degree of stiffening of the upper bar 19.4 in this form of the invention, a rib 19.6 is formed on the inner or lower side of the upper bar.

The lower bar 20.2 is arranged beneath the upper bar 19.4 and has its opposite ends connected to the adjoining opposite ends 19.5 of the upper bar 19.4. It will be noted that when a person manually grips and squeezes the upper and lower bars 19.4 and 20.2 together so as to flex the upper and lower bars, the lower bar 20.2 aids materially in the straightening of the upper bar 19.4 so as to angularly reorient the end portions 19.5, causing an outward swinging of the legs 16.2. Of course, this permits the receptacle-supporting lugs 17.2 to be swung outwardly for application to the receptacle end walls. The lower bar 20.2 is provided with a stiffening rib 20.3 so that the stiffness of this lower bar is approximately the same as the stiffness of the upper bar 19.4.

It will be seen that I have provided a new and improved handle with depending legs which are readily and easily attachable to opposite receptacle side walls and wherein the handle essentially spans the receptacle and has superposed upper and lower bars extending transversely of the depending legs so that by simply manually gripping and squeezing the superposed upper and lower bars between the legs, the legs can be swung outwardly for detaching or attaching the legs on a receptacle.

What is claimed is:

1. A handle to span a receptacle attached to the walls thereof, comprising:
   a pair of stiff upright legs to lie against the receptacle walls, the lower ends of the legs having means for attaching to the receptacle walls, and
   leg manipulating means attached to the upper ends of said legs and including a pair of elongate and stiff, but resiliently flexible bars extending transversely of the upper ends of the legs and in spaced and superposed relation to each other to produce outward swinging of the lower ends of the legs and of the attaching means when one of said bars is flexed toward the other of the bars.

2. A handle to span a receptacle and attach to the opposite sides thereof, comprising:
   a pair of stiff upright legs to lie against the receptacle, the lower ends of the legs having means for attaching to the opposite sides of the receptacle, and
   leg manipulating and suspending means attached to the upper ends of said legs and including an elongate and stiff but resiliently flexible bar extending transversely between the upright legs and connected to the upper end portions of said legs, and a second elongate and stiff bar connected to one of the legs and extending along the first mentioned bar to be simultaneously manually gripped and squeezed to produce inward and outward motion of the lower ends of the legs relative to each other.

3. The detachable receptacle handle according to claim 2 wherein said transversely extending flexible bars being arranged in superposed relation with each other,
   the upper bar being connected at its opposite ends in a stiff and substantially inflexible connection to the upper ends of the legs whereby bowing of the upper bar and the angular reorientation of the ends of the upper bar produces swinging of the lower ends of the legs.

4. The detachable receptable handle according to claim 3 and the lower bar being secured to the upper bar adjacent the ends thereof.

5. The detachable receptacle handle according to claim 3 and the lower bar being fastened to the legs in spaced relation to the top bar to normally restrain motion of the legs as the upper ends thereof are pulled inwardly by bowing of the upper bar and thereby cause outward swinging of the lower ends of the legs.

6. The detachable receptacle handle according to claim 2 and the lower bar being attached to the legs below the upper ends thereof, the upper bar bowing to shorten and pull in the ends of the legs and cause outward swinging of the lower ends of the legs.

7. The detachable receptacle handle according to claim 6 and the lower bar being bowed in relaxed condition to thereby orient end portions thereof obliquely to each other, the upper and lower bars cooperating when simultaneously flexed to swing the lower ends of the legs outwardly.

8. The detachable receptacle handle according to claim 7 and the bowed lower bar being oriented with the end portions extended outwardly and obliquely upwardly, and convergently with respect to the upper bar, whereby to produce the desired flexing of the lower bar and bowing of the upper bar with simultaneous squeezing of the two bars toward each other.

9. A handle to span a receptacle and attached to the walls thereof, comprising:
- a pair of stiff upright legs to lie against the receptacle walls,
- a pair of projections extending toward each other and each being affixed on the lower end of a respective leg for engaging the receptacle wall,
- a lifting and manipulating bar extending transversely between the upper ends of the legs and being stiff but resiliently flexible, the ends of the bar having stiff, substantially non-hinging connections with the upper ends of the legs to produce swinging of the legs as the lifting bar is bowed, and
- a lower leg manipulating bar extending transversely between the legs and below said lifting bar, the lower bar having opposite ends, each respectively secured to a leg at a location spaced downwardly from the upper end of the leg and also spaced downwardly from the lifting bar, the lower bar being bowed downwardly and being stiff but resiliently flexible to be straightened when the lifting bar and lower bar are manually gripped and squeezed toward each other, whereby to swing the lower ends of the legs outwardly away from each other and away from the receptacle walls.

10. The detachable receptacle handle according to claim 9 and wherein said upper bar has minimal stiffness relative to the stiffness of the lower bar.

References Cited
UNITED STATES PATENTS

| | | | |
|---|---|---|---|
| 2,024,849 | 12/1935 | Eliopoulus | 294—99 R |
| 3,628,824 | 12/1971 | Leuw | 294—99 R |
| 3,193,316 | 7/1965 | Custer | 294—33 |

EVON C. BLUNK, Primary Examiner

D. C. BELLIS, Assistant Examiner

U.S. Cl. X.R.

294—15, 99 R